Patented Jan. 1, 1924.

1,479,133

UNITED STATES PATENT OFFICE.

HERBERT C. GORE, OF TAKOMA PARK, MARYLAND; DEDICATED, BY MESNE ASSIGNMENTS, TO THE PEOPLE OF THE UNITED STATES.

DIASTATIC MATERIAL AND PROCESS OF MAKING THE SAME.

No Drawing.   Application filed May 22, 1923. Serial No. 640,779.

(FILED UNDER THE ACT OF MARCH 3, 1883, 22 STAT. L., 625.)

*To all whom it may concern:*

Be it known that I, HERBERT C. GORE, a citizen of the United States of America, and an employee of the United States Department of Agriculture, residing at Takoma Park, Maryland, have invented a new and useful Diastatic Material and Process of Making the Same.

This application is made under the act of March 3, 1883, chapter 143 (22 Stat., 625), and the invention herein described and claimed may be used by the Government of the United States, its officers and employees, and by any citizen of the United States either in public or private work without payment to me of any royalty thereon.

Ordinarily, in carrying out mashing operations, it is customary to add the malt or infusion of malt directly to the aqueous suspension of grains or other material containing starch to be digested by action of the malt. The malt, or infusion of malt however, contains other extractives beside the diastase, which become part of the mash. Frequently the presence of such extractives is undesirable. They usually impart color and flavor to the mash, and in addition to this impart nitrogenous material which makes the mash more susceptible to mold and also may cause it to discolor when evaporated and strongly heated. I find that in certain mashing operations, especially in the preparation of maltose sirup of high density, it is much better to use a highly purified preparation of diastase, which I find can be easily prepared from malt by the process described below.

Furthermore, by my process, the diastase may be obtained in highly concentrated form, much more convenient to transport, store and use than barley or other types of malt.

By my process the diastase is precipitated and by far the greater proportion of the coloring and flavoring materials derived from the malt remain in solution and can be removed by filtering off, and washing the precipitated diastase.

The precipitate containing diastase is then so treated that the diastase becomes activated. On using such a preparation in a mash containing starch, I find that it is possible to convert the starch into maltose and dextrin in the usual way, at the same time introducing practically no extraneous colors and flavors derived from the malt. By using starch of high purity it is possible to prepare a maltose sirup very light in color and almost flavorless. Such maltose sirup discolors less readily when heated to high temperature than sirup prepared by the use of malt extract.

In carrying out my process I prepare an infusion of malt in any practical way, for example I soak the malt in five parts of water and then filter, when the clear filtrate is ready for treatment. I now add to the clear filtrate approximately one per cent of tannic acid, stir and let stand. The precipitate which forms contains practically all of the diastase, together with some of the protein material in the malt infusion. This tannic acid precipitate is now filtered off and washed in any practical way. I find for example that it filters readily and can be easily collected either on a suction filter of the type known as the Büchner funnel or in the filterpress, and can be very readily washed in the usual manner. It is also practical to throw out the precipitate by application of centrifugal methods, employing either a continuous centrifugal or using the common laboratory centrifuge employed in dealing with such products as blood, serum, etc. After the precipitate has been separated and washed I find that the greater part of the diastase can be freed from its combination, or association, with the tannin by treating the tannin precipitate with a solution of gelatin, using from one to two times as much gelatin as tannic acid. I find that instead of gelatin, other materials of like nature, for example, hide powder, can be employed. In treating the precipitate with gelatin, I find that an acceptable method is to suspend the precipitate in water and add the gelatin, using a five or ten per cent solution. After the gelatin is added, the mixture is allowed to stand for a short time. The precipitate which is formed by the reaction of the tannin precipitate with the gelatin, may then be removed in any practical way, as by filtration or by centrifugal means, and the filtrate or supernatant liquor will then contain a very large proportion of the diastase originally present in the barley malt. Approximately fifty per cent of the diastase can be easily recovered. This filtrate, or supernatant liquor, can, if desired, be evaporated to dryness by boiling in vacuum or by other means usually employed for concentrating solutions and solid diastase preparation of high diastatic power thus prepared, or it can be used directly without drying. Or, I find that, e. g. in the conversion of corn starch into maltose sirup the tannin-gelatin precipitate need not be separated, but the entire mixture consisting of tannin-gelatin precipitate, more or less excess gelatin, and diastase (existing both in solution or absorbed by the precipitate) may be successfully employed. In the event that it is used directly, with or without filtering, I find that it can be preserved for an indefinite period by the use of toluene.

For example: 500 g. of ground barley malt of Lintner value 120 was macerated over night with 2500 cc. of cold water, a little toluene being mixed with the mash as a preservative. The mash was then filtered, the filtrate measuring 1935 cc. Forty cc. of a solution of tannic acid containing 10 g. of tannic acid per 100 cc. were then added, the precipitate filtered off on a Büchner funnel with suction, washed on the filter with water, then scraped from the filter paper, stirred up in water, and 40 cc. of a solution of gelatin added containing 10 g. of gelatin in 100 cc. The mixture was then mixed with ignited kieselguhr and filtered. Filtration was very slow. The filtrate measured 160 cc. The filtrate was evaporated to dryness by first concentrating in vacuo to small volume, then transferring to a vacuum desiccator and drying over night in presence of sulfuric acid, in a vaccum in about 1 mm. The dry vitreous mass weighed 1.49 g. It had a diastatic value of 145 on Lintner's diastase scale.

I claim:

1. A new process of preparing diastatic and other enzymes consisting of precipitating an aqueous extract containing enzymes with tannic acid or other tannin-containing material, separating the enzyme bearing precipitate, and digesting it with an aqueous preparation of gelatin, capable of reacting with tannin and thus set free a large proportion of the enzyme.

2. A new process of concentrating malt diastase consisting of precipitating an aqueous diastatically active infusion of malt with tannic acid, or other tannin-containing material, separating the diastase-containing precipitate, and digesting it with an aqueous solution or suspension of gelatin, hide powder, or other nitrogenous material capable of reacting with tannin and thus set free a large proportion of the diastase.

3. A new diastatically active material consisting of a mixture of diastase-containing tannic acid precipitate of a diastatically active infusion of malt with sufficient aqueous solution or suspension of gelatin, hide powder, or other nitrogenous material capable of reacting with tannin to set free a large proportion of the diastase.

4. A new diastatically active material consisting of a diastase-containing solution, or solid, prepared by treating an aqueous infusion of malt with tannic acid, or other tannin-bearing material, then separating the precipitate formed and digesting it with sufficient gelatin, hide powder, or other nitrogenous material capable of reacting with tannin to set free a large proportion of the diastase, then separating the liquid from the solid portion and concentrating the solution.

5. A new process of preparing diastatic and other enzymes consisting of precipitating an aqueous extract containing enzymes with tannic acid or other tannin-containing material, separating the enzyme bearing precipitate, and digesting it with an aqueous preparation of protein capable of reacting with tannin and thus set free a large proportion of the enzyme.

HERBERT C. GORE.